(12) United States Patent
Tsujimoto et al.

(10) Patent No.: US 6,421,894 B1
(45) Date of Patent: Jul. 23, 2002

(54) APPARATUS FOR ASSEMBLING AN ANTI-VIBRATION DEVICE

(75) Inventors: Yoshikazu Tsujimoto; Tsuyoshi Inada, both of Osaka (JP)

(73) Assignee: Toyo Tire & Rubber Co., Ltd, Osaka (JP)

(*) Notice: Subject to any disclaimer, the term of this patent is extended or adjusted under 35 U.S.C. 154(b) by 0 days.

(21) Appl. No.: 09/825,256

(22) Filed: Apr. 3, 2001

(51) Int. Cl.[7] .......................... B23P 19/00; B21D 39/02
(52) U.S. Cl. ..................... 29/33 K; 29/447; 72/405.03; 413/43; 413/62
(58) Field of Search .................. 29/33 K, 243.5, 29/243.517, 447, 512, 727; 72/442, 405.02, 405.03, 405.04, 405.05; 267/140.13; 413/43, 62, 6

(56) References Cited

U.S. PATENT DOCUMENTS

| | | | | |
|---|---|---|---|---|
| 2,282,959 A | * | 5/1942 | Gibbs | 72/405.03 |
| 3,800,401 A | * | 4/1974 | Jesevich et al. | 29/512 |
| 3,848,557 A | * | 11/1974 | Holk, Jr. | 113/121 C |
| 4,118,855 A | * | 10/1978 | Lequeux | 29/447 |
| 4,455,728 A | * | 6/1984 | Hesse | 29/727 |
| 4,540,323 A | * | 9/1985 | Inoue et al. | 413/6 |
| 4,987,765 A | * | 1/1991 | Nishimura et al. | 72/405.03 |
| 5,014,601 A | * | 5/1991 | Sundholm | 92/109 |
| 5,176,369 A | * | 1/1993 | Ito | 267/140.13 |
| 5,715,652 A | * | 2/1998 | Stahlecker | 29/512 |

FOREIGN PATENT DOCUMENTS

| | | | | |
|---|---|---|---|---|
| JP | 9-229128 | * | 9/1997 | 29/447 |
| JP | 9-329208 | * | 12/1997 | 29/447 |

\* cited by examiner

*Primary Examiner*—William Briggs
(74) *Attorney, Agent, or Firm*—Jordan and Hamburg LLP

(57) ABSTRACT

The present invention provides, in assembling an anti-vibration device having an inner cylinder, an outer cylinder, a rubber elastic member joining them and an intermediate cylinder fitted to the outer cylinder and internally forming a liquid chamber, an assembling apparatus for caulking an end of the outer cylinder while suppressing the occurrence of buckling without causing cracks, breakage or the like. This assembling device has a press-fit device to press-fit an internal unit joined with the inner cylinder and the intermediate cylinder through a rubber elastic member to the outer cylinder within a liquid tank, a caulking device to caulk an end of the outer cylinder of an assembly completed in press-fitting, and transporting means to transport the assembly from the press fit device to the caulking device. The caulking device can perform caulking in two stages of caulking.

5 Claims, 10 Drawing Sheets

APPARATUS FOR ASSEMBLING AN ANTI-VIBRATION DEVICE

BACKGROUND OF THE INVENTION

1. Technical Field

The present invention relates to an apparatus for assembling an anti-vibrating device of a liquid-filled type principally used as a vehicular body mount or engine mount or the like.

2. Related Art

Figure 11:
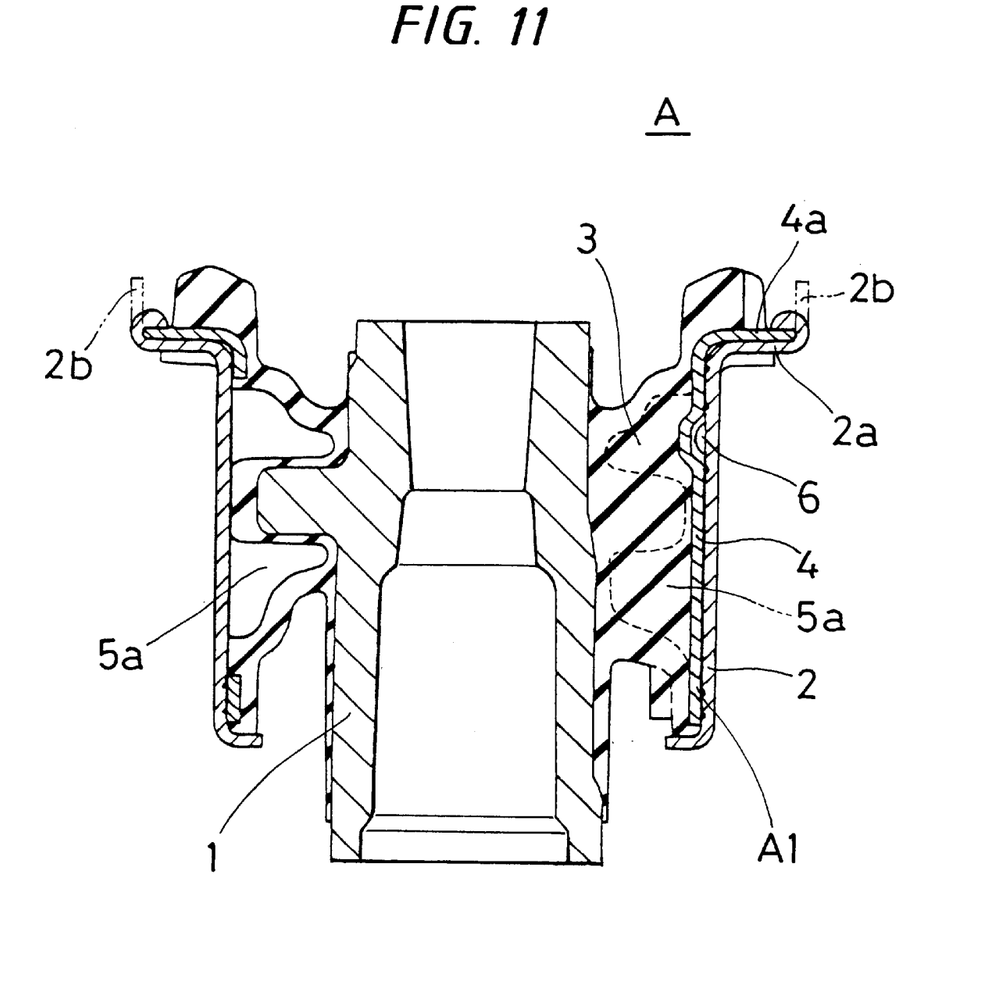
FIG. 11 is a sectional view of an anti-vibration device.

A liquid-filled-type anti-vibration device A, for example, as shown in FIG. 11 has been developed as a body mount to be interposed between a vehicular body and a frame such as a suspension on a support side to support the body in an anti-vibrating fashion.

This anti-vibration device A has an inner cylinder 1 made of a comparatively thick-walled metal to be coupled and fixed to one of the vehicular body and the frame on the suspension side and an outer cylinder 2 made of a metal to be coupled and fixed to the other. The inner and outer cylinders 1, 2 are joined through a rubber elastic member 3 vulcanization-bonded to an outer periphery of the inner cylinder 1 and an intermediate cylinder 4 fitted at an inner side of the outer cylinder. Furthermore, two liquid chambers 5a, 5b are provided between the inner and outer cylinder 1, 2 in locations opposed to each other sandwiching the inner cylinder 1. These liquid chambers 5a, 5b are in mutual communication through an orifice passage 6, thus obtaining a vibration damping effect due to an effect of liquid flow between the chambers.

The foregoing intermediate cylinder 4 is vulcanization-bonded to the outer periphery of the rubber elastic member 3. The intermediate cylinder 4 has at one end an outwardly directed flange 4a and opened in a window form in the position corresponding to the chambers 5a, 5b, and press-fitted to the inner side of the outer cylinder 3 through a sealing rubber layer 7 and fitted airtight, thereby forming the liquid chamber 5a, 5b between the cylinders 1, 2.

Furthermore, the outer cylinder 2 has a flange 2a bent to an outer side with which the flange 4a of the intermediate cylinder 4 contacts. The flange 2a has an end 2b caulked inside and fixed in a manner wrapping from an outside an end edge of the flange 4a of the intermediate cylinder 4, thereby firmly holding the fit state.

In the manufacture of the anti-vibration device A structured as above, previously prepared is an internal unit A1 integrated with an inner cylinder 1 and an intermediate cylinder 4 through a rubber elastic member 3 by vulcanization-forming the rubber elastic member 3. Separately from this, previously formed is an outer cylinder 2 having at one end a flange 2a and bent at the end 2b thereof to an axial direction as the chain line of FIG. 11.

In an assembling process, in a liquid tank filled with a liquid such as ethylene glycol to be charged in the internal liquid chambers 5a, 5b, the internal unit A1 is press-fitted into the outer cylinder 2 in a direction from the flange 2a while discharging interior air, thereby bringing the flange 4a of the intermediate cylinder 4 into contact with the flange 2a of the outer cylinder 2. Furthermore, in this state, the flange 2a of the outer cylinder 2 is caulked to be bent inward, thus completing the assembling.

In this assembling, conventionally the caulking at the flange end of the outer cylinder 2 has been made by a oncebending process. In this case, because the end 2b of the flange 2a of the outer cylinder 2 is bent inward by once caulking to an inward that is in generally a rectangular direction from the axial direction of the outer cylinder, the bend angle amounts to 90 degrees or greater and the deformation amount is large. There has been a possibility that the bend portion buckles readily causing cracking and breakage. Consequently, there has been a setback to reducing the product durability and quality and further yield of manufacture.

It is an object of the present invention to provide, as principally an assembling apparatus for a liquid-filled-type anti-vibration device, an assembling apparatus which can caulk an end edge of an outer cylinder while suppressing occurrence of buckling without causing crack or breakage, thereby improving the endurance and quality of an anti-vibration device to be assembled and further improving manufacture yield.

SUMMARY OF THE INVENTION

An apparatus for assembling an anti-vibration device of the present invention has an inner cylinder, an outer cylinder arranged outward of the inner cylinder, a rubber elastic member arranged between the inner and outer cylinders, an intermediate cylinder fitted inward of the outer cylinder, and a liquid chamber formed in an interior of the rubber elastic member, the anti-vibration device assembling apparatus comprising: a press-fit device for press-fitting an internal unit united with an inner cylinder and an intermediate cylinder through a rubber elastic member to an outer cylinder within a liquid tank; a caulking device for caulking an axial one end of the outer cylinder of an assembly completed of press-fitting; and transport means for transporting the assembly from the press-fit device to the caulking device; wherein the caulking device being provided to allow two stages of caulking by first and second two kinds of caulking dies including caulking to bend an end of the outer cylinder of the assembly by a predetermined angle less than 90 degrees and caulking to further bend the end of the outer cylinder already bent to a certain degree into a predetermined caulking form.

According to this assembling apparatus, an internal unit united with an internal cylinder and an intermediate cylinder through a rubber elastic member and an outer cylinder are supplied to the press-fit device to press-fit the internal unit to the outer cylinder within a liquid tank. An assembly thus completed in press-fitting is transported by proper transport means from the press-fit device to the caulking device to carry out caulking. On this occasion, a first-staged caulking is made by the first caulking die to bend an end of the outer cylinder of the assembly by a predetermined angle less than 90 degrees. Next, second-staged caulking is made by the second caulking die to bend furthermore the one end of the outer cylinder already bent to a certain degree and finally form it into a predetermined caulking form.

In this manner, when caulking one end of the outer cylinder, predetermined caulking is completed to a bend angle of about 90 degrees or greater by two-staged caulking with the first caulking die and second caulking die.

Due to this, as compared to the conventional case of once caulking to a predetermined angle, it is possible to prevent the occurrence of damage, such as cracks, and hence improve the endurance and quality of the anti-vibration device manufactured. Also, prevention is made against occurrence of cracks due to bending in caulking, the manufacture yield of the anti-vibration device is by far improved.

The caulking device may comprise a caulking lower die for supporting the assembly with the axial one end to be caulked positioned up, and first and second caulking dies vertically movably supported in the above of the lower die, the first caulking die for applying a first stage of caulking to the axial one end of said outer cylinder of said assembly supported in said lower die, and said second caulking die for applying a second stage of caulking to the one end in order for further bending into a predetermined form.

According to this caulking device, the assembly completed in press-fit in the press-fit device is supported in the caulking lower die with the axial end positioned up. In this state, the first caulking die is first descended relative to the lower die and first-staged caulking is made to bend the axial end of the outer cylinder of the assembly by a required predetermined angle less than 90 degrees. Next, the second caulking die is descended relative to the lower die and the one end of the outer cylinder somewhat bent as above is further bent into a predetermined form. This makes it possible to caulk the one end of the outer cylinder in two stages while holding it in the same support position, thereby suppressing the occurrence of buckling in the bend portion.

In the assembling apparatus of the invention, the first caulking die and second caulking die in the above of the lower die are movably provided in a transverse direction to an axis thereof and alternately oppositely positioned to the lower die.

Due to this, the first caulking die is previously positioned oppositely above the lower die. Due to the descend action of it, a first stage of caulking is made to the axial one end of the outer cylinder of the assembly supported in the lower die. Next, alternately to the first caulking die, the second caulking die is positioned oppositely above the lower die whereby the descend action of it can make a second stage of caulking. Accordingly, it is possible to automatically carry out caulking to a predetermined angle due to bending twice without the intervention of an operator, improving by far operationality.

In the assembling apparatus, the caulking lower die preferably has, in an axis portion, a support pin vertically movable to fit with and support the inner cylinder of the assembly, and first and second caulking dies have, in respective lower axis portions, pins to fit in an upper potion of an inner cylinder of the assembly due to descend action. Due to this, during caulking, the assembly completed in press-fit can be formed in the state that the inner cylinder is held at axial portion by the vertically fit pin and support pin. This can provide caulk-fixing evenly over the entire periphery without deviation.

Also, the transport means of the assembling apparatus may comprise an arm of a robot having, at a tip, clamp means to grip the internal unit and the assembly to carry out supply of the internal unit to the press-fit device, transport of the assembly completed of press-fitting from the press-fit device to the caulking device and taking the assembly completed of caulking out of the caulking device, in a manner related to press-fit and caulking action. This can automate and enhance the efficiency of a series of operations in assembling an anti-vibration device and caulking.

DETAILED DESCRIPTION OF THE PREFERRED EMBODIMENT

Now a preferred embodiment of an anti-vibration-device assembling apparatus of the present invention will now be explained with reference to the drawings.

Herein, an anti-vibration device A to be assembled is similar to the anti-vibration device A exemplified in FIG. 11, and the outline of its structure and manufacture is as per the explanation in the background art and duplicated explanation will be omitted. Also, where reference in the below explanation is made to FIG. 11, the same reference numerals will be used.

Figure 1:
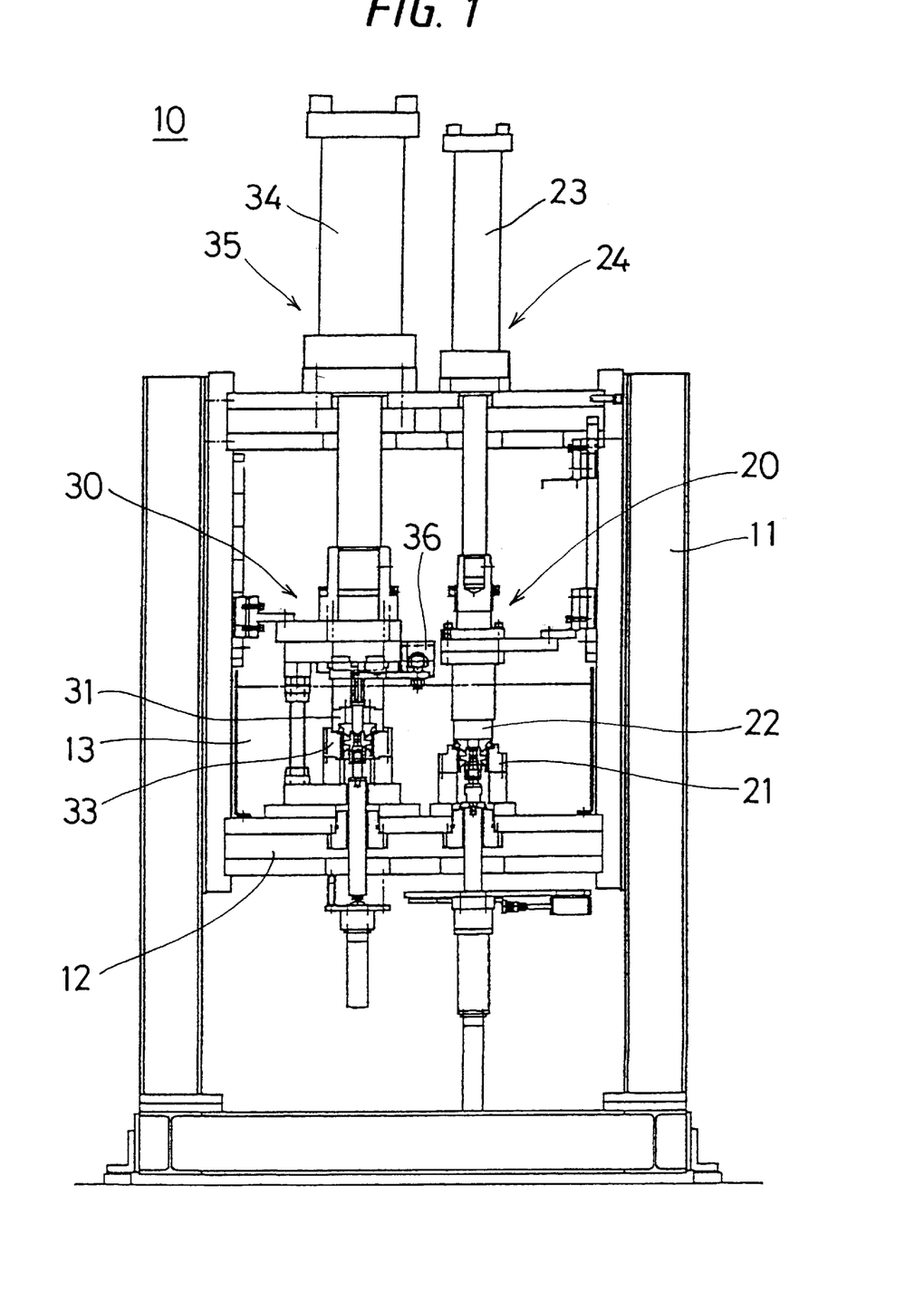
FIG. 1 is a front view of an assembling apparatus for an anti-vibration device of the present invention.
Figure 2:
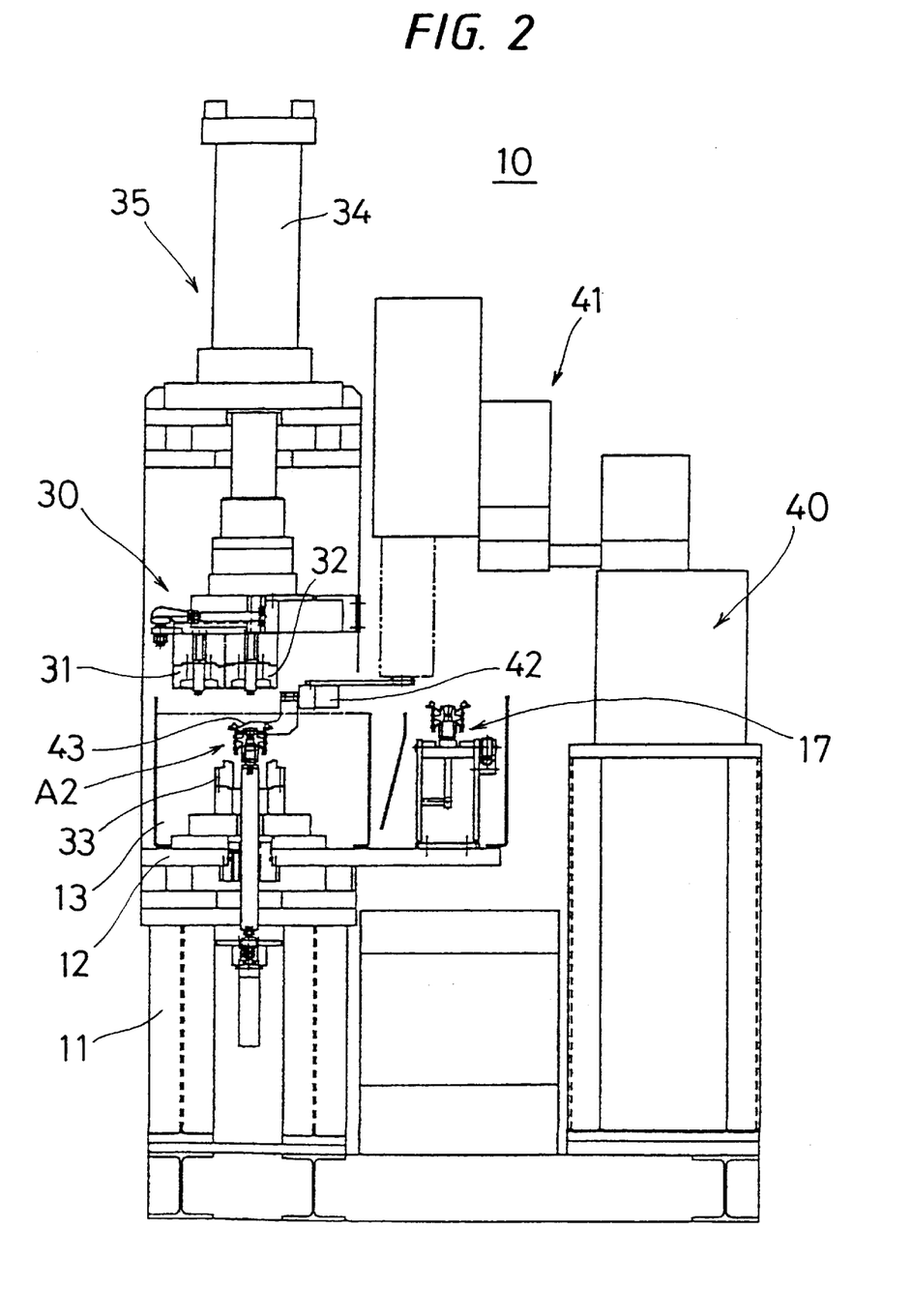
FIG. 2 is a side view of the assembling apparatus.
Figure 3:
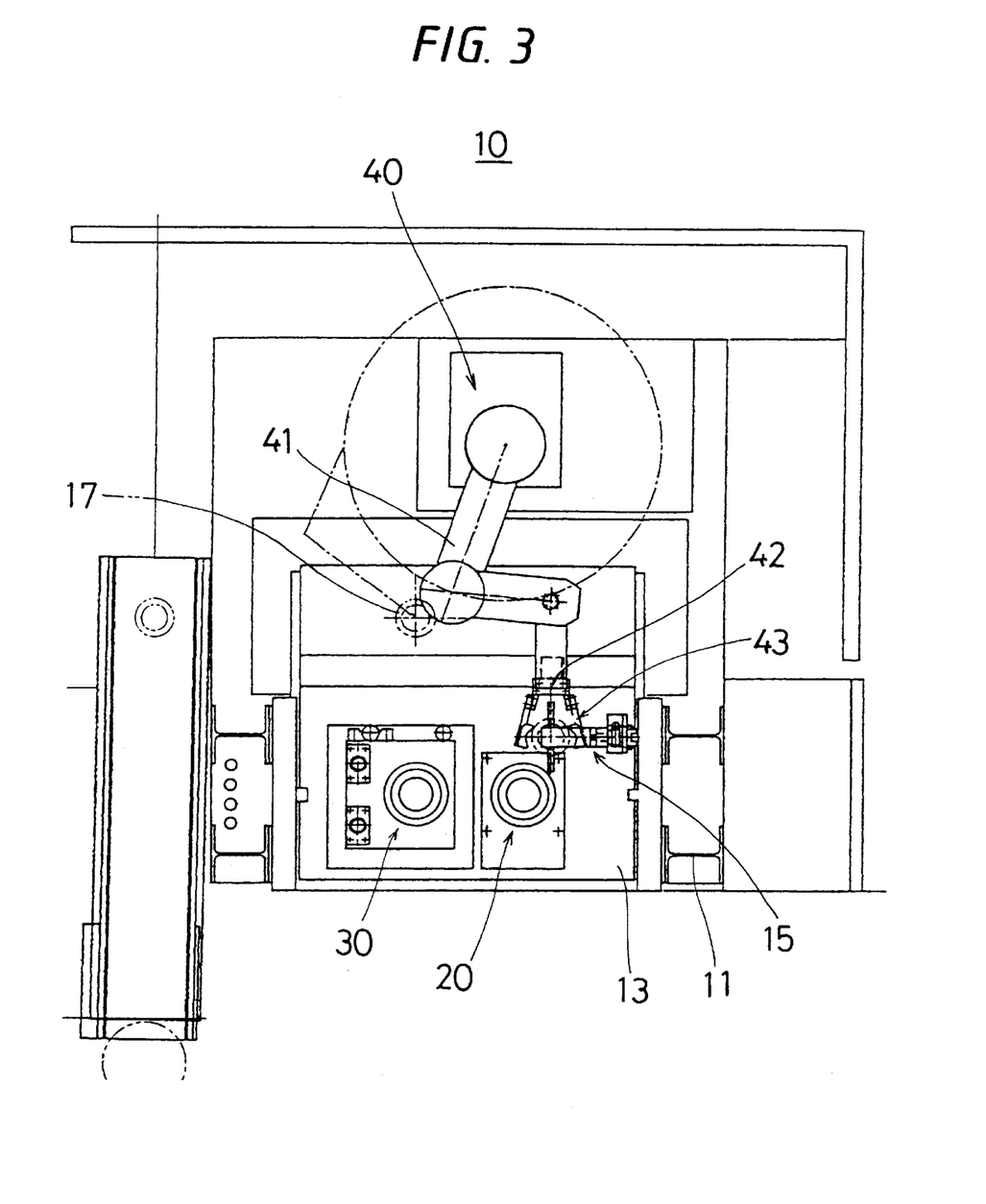
FIG. 3 is a cross sectional plan view of the assembling apparatus.

FIG. 1 to FIG. 3 shows an overall structure of an assembling apparatus 10 according to an embodiment of the present invention. Explained is the outline of a structure of this assembling apparatus 10.

In the assembling apparatus 10, a table 12 is provided on a frame 11. On the table 12, a liquid tank 13 is provided that is filled with a liquid to be charged to the anti-vibration apparatus A being assembled. This apparatus 10 has a press-fit device 20 for press-fitting an internal unit A1 integrated with the internal cylinder 1 and intermediate cylinder 4 of FIG. 11 through a rubber elastic member 3 into an outer cylinder 2 within the liquid tank 13, and a caulking device 30 for caulking an axial one end of an outer cylinder 2 of an assembly A2 completed in the press-fitting, particularly an end 2b of the flange 2a, within the liquid tank 13. Furthermore, on the backside of them (on the upper side in FIG. 3), a robot 40, hereinafter described, is set up.

As the press-fit device 20, a press-fit lower die 21 is provided on a bottom of the liquid tank 13 and a press-fit upper die 22 that is provided above the lower die 21 in a coaxial and vertically opposed relation. This press-fit upper die 22 is mounted at a lower end of urging means 24 having a drive source 23, such as a hydraulic cylinder fixed at an upper portion of the frame 11, and supported for vertical movement so that urging upon press-fit is made by descending of the same.

Figure 4:
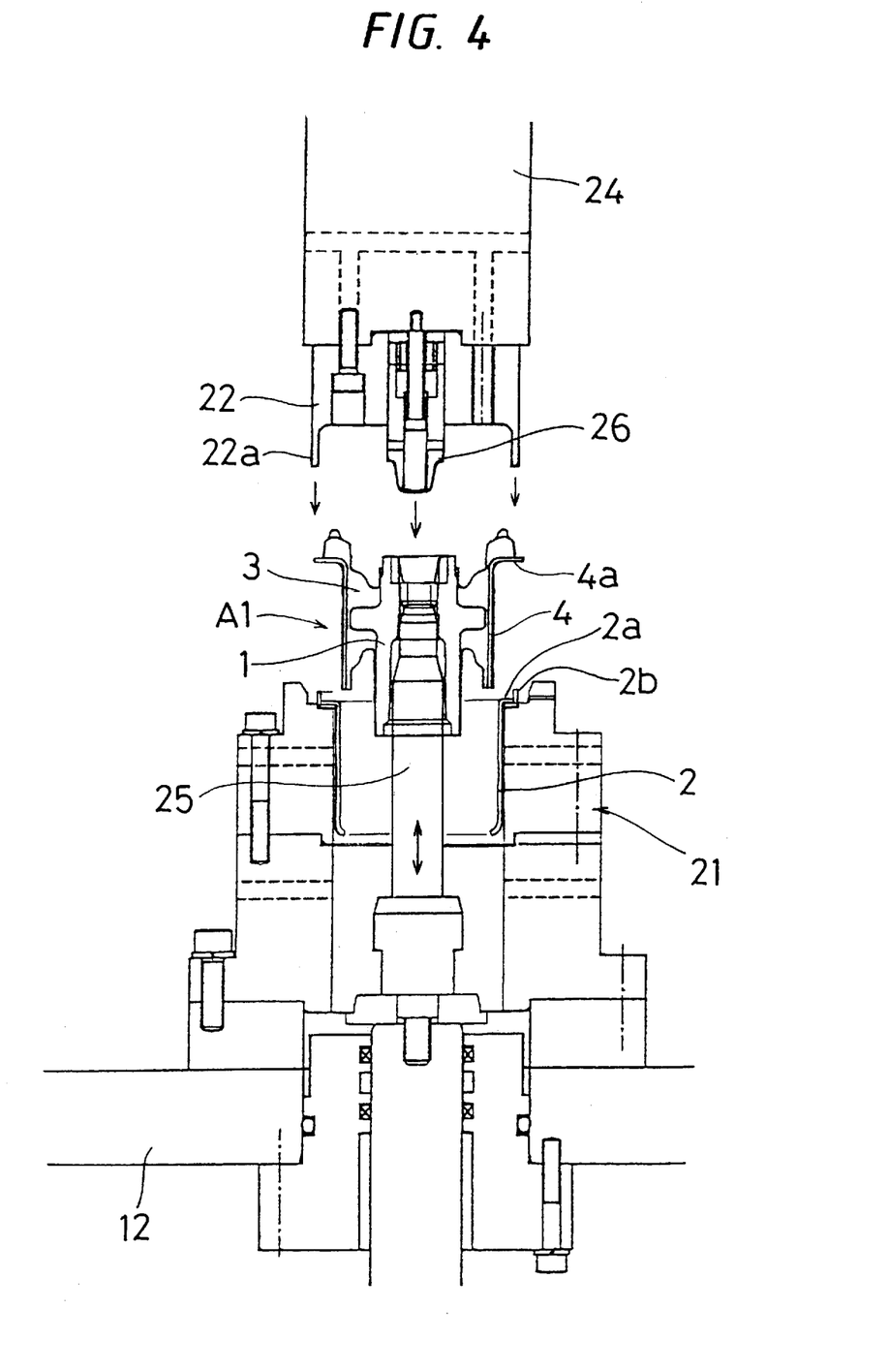
FIG. 4 is a magnified front view of a press-fit device of the assembling apparatus in a state before press-fitting an internal unit to an outer cylinder.
Figure 5:
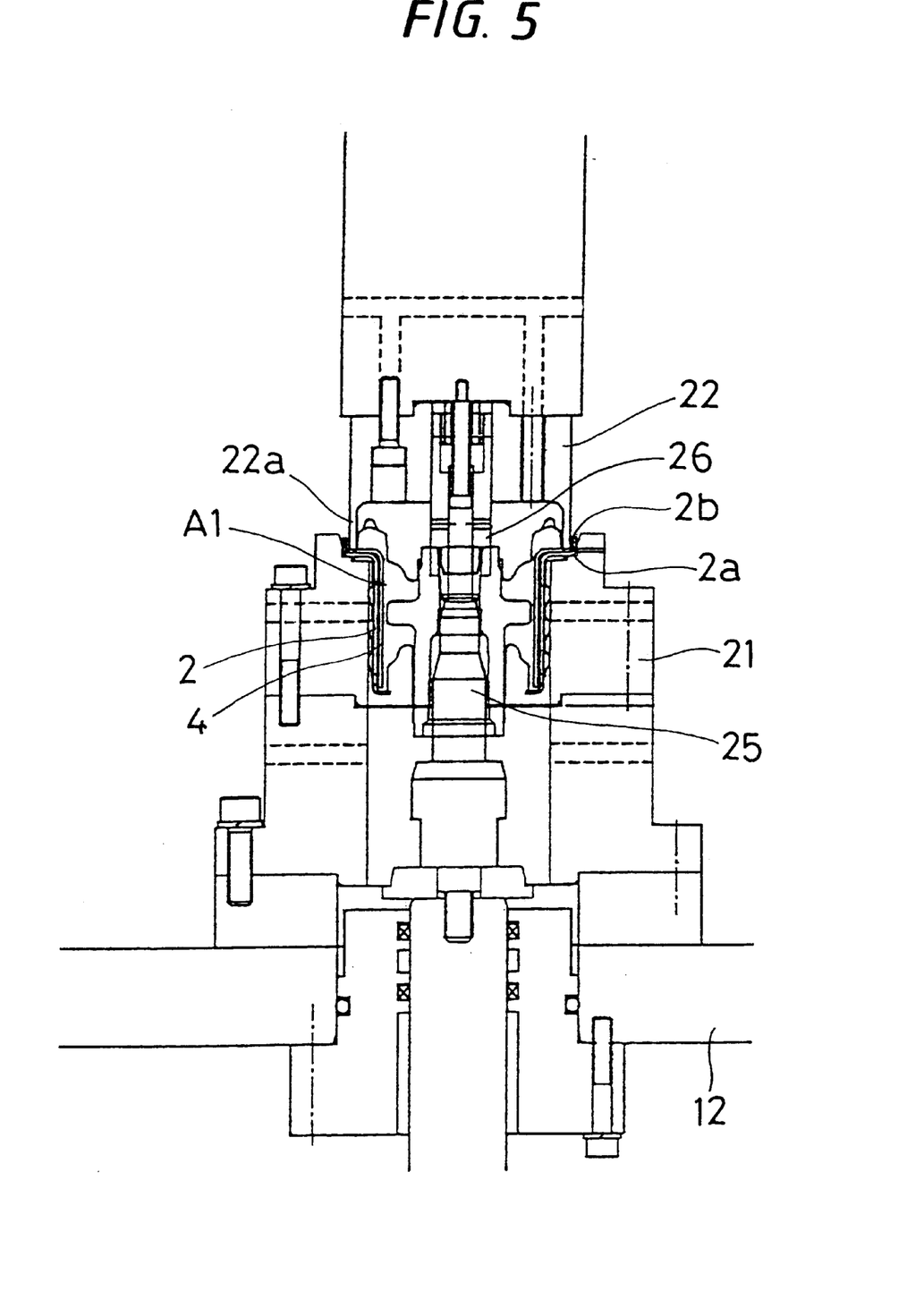
FIG. 5 is a magnified front view of the press-fit device in a state of press-fit completion.

The press-fit lower die 21 is formed, as shown in FIG. 4, formed annular to receive the outer cylinder and in a corresponding form that an top peripheral edge of an bore can hold the flange 2a of the outer cylinder 2 in a fit state (chain line in FIG. 4). On an inner axis of the lower die 21, a support pin 25 is vertically movably provided whose tip can fit with and support the inner cylinder 1 of the internal unit A1 to be press-fit in the outer cylinder 2. Also, the press-fit upper die 22 is vertically provided, at its lower peripheral edge, with an urging part 22a to press down the flange 4a of the intermediate cylinder 4 of the internal unit A1. Furthermore, on an inner axis of the urging part 22a, a pin 26 projects to fit with the inner cylinder 1 of the internal unit A1. This pin 26 and the support pin 25 cooperatively hold and press-fit the internal unit A1 in an aligning state to the outer cylinder 2.

Meanwhile, as the caulking device 30, a caulking lower die 33 is provided in a position other than that of the press-fit device 20 on the bottom of the liquid tank 13, to support an assembly A2 completed in press-fit in the press-fit device 20. Also, in the above of the lower die 33 are provided first and second caulking dies 31, 32. The first and second caulking dies 31, 32 are attached at a lower end of one of urging means 35 having a drive source 34, such as a hydraulic cylinder, fixed in an upper portion of the frame 11 and supported for vertical movement. Particularly, the first and second caulking dies 31, 32 are attached slidable in a direction orthogonal to the axis between the axis of the lower die 33 and the position off the axis, and provided so that they alternately position oppositely above the axis with the lower die 33. Due to this, provision is made to make predetermined caulking by descending action in a state corresponding position of the axis of the lower die 33. 36 is advance/retract means for the hydraulic cylinder or the like to slide-move the both dies 31, 32.

Figure 7:
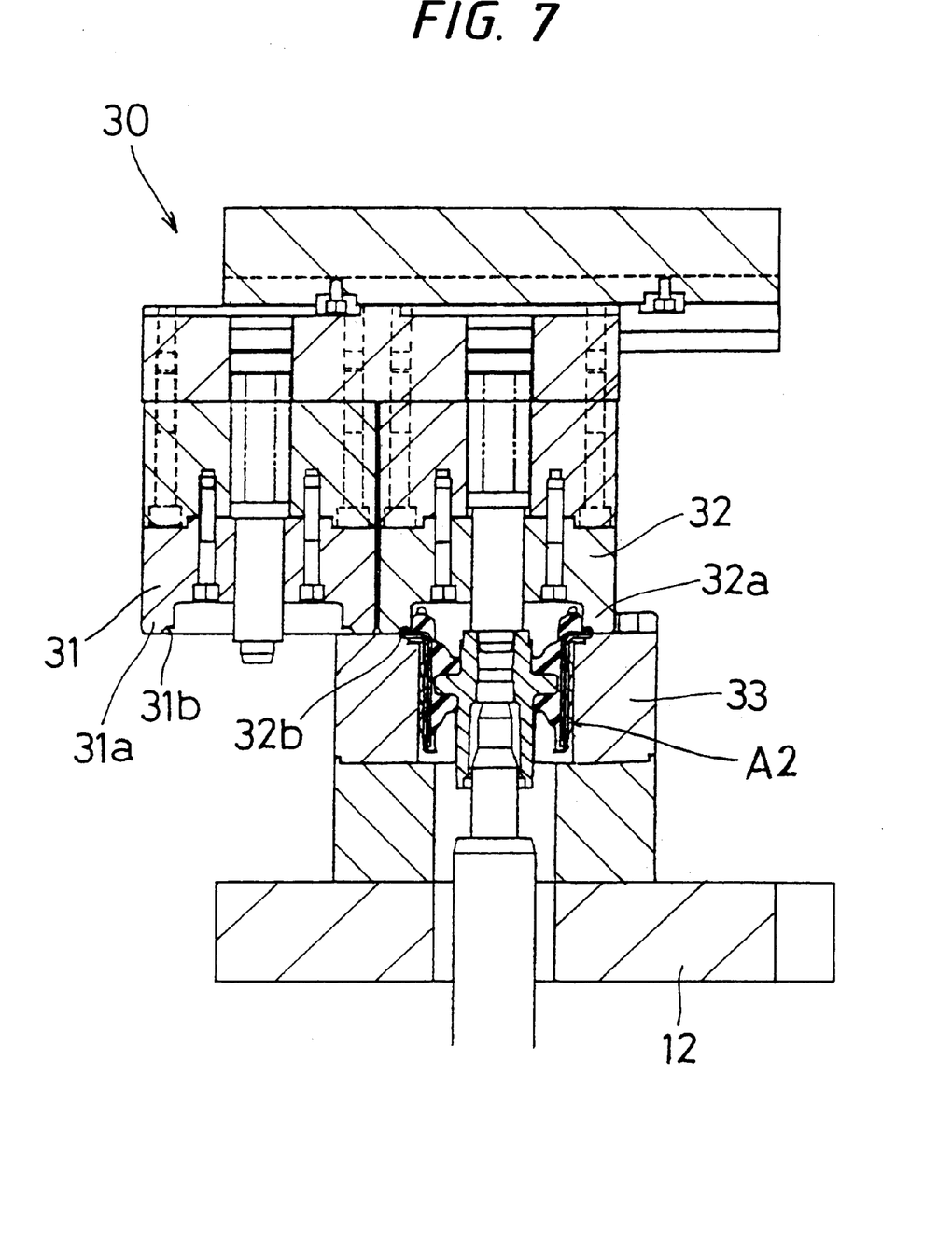
FIG. 7 is a sectional view on line B—B of the caulking device.

FIG. 1 shows first caulking die 31 opposed to caulking lower die 33, while FIG. 7 shows second caulking die 32 opposed to caulking lower die 33.

Figure 8:
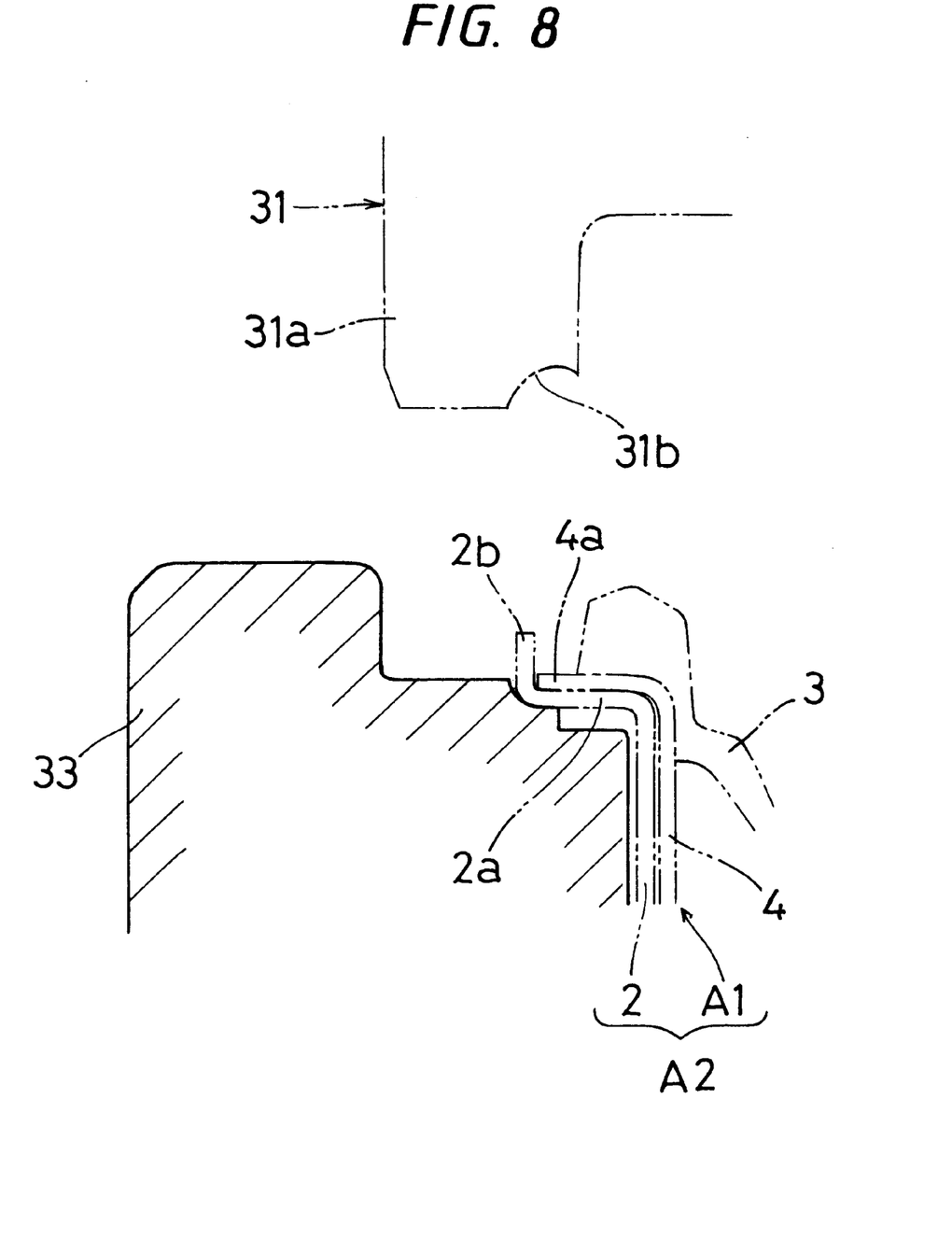
FIG. 8 is a magnified sectional view of an essential part of the caulking device in a state that an assembly completed of press-fitting is held by a caulking lower die.

The caulking lower die 33 is formed annular to receive the outer cylinder 2 of an assembly A2 having press-fit with outer cylinder hardware 3 in the internal unit 10 and in a corresponding form that an top peripheral edge of an bore can hold the flange 2a of the outer cylinder 2 in a fit state (chain line in FIG. 8), and further provided at outer portion with a recess to receive the first and second caulking dies 31, 32. On the axis of the lower die 33, a support pin 37 is provided for vertical movement whose tip can fit with the inner cylinder 1 of the assembly A2 and support the same.

Meanwhile, the first and second caulking dies 31, 32 respectively have, in their lower end peripheries, annular projection 31a, 32a to urge the end 2b of the flange 2a of the outer cylinder 2 of the assembly A2. These projecting die portions. 31a, 32a are formed, in their tip peripheries, with curved surfaces 31b, 32b each to bend inward the flange end 2b by a predetermined angle of less than 90 degrees and subject it to predetermined caulking.

Figure 9:
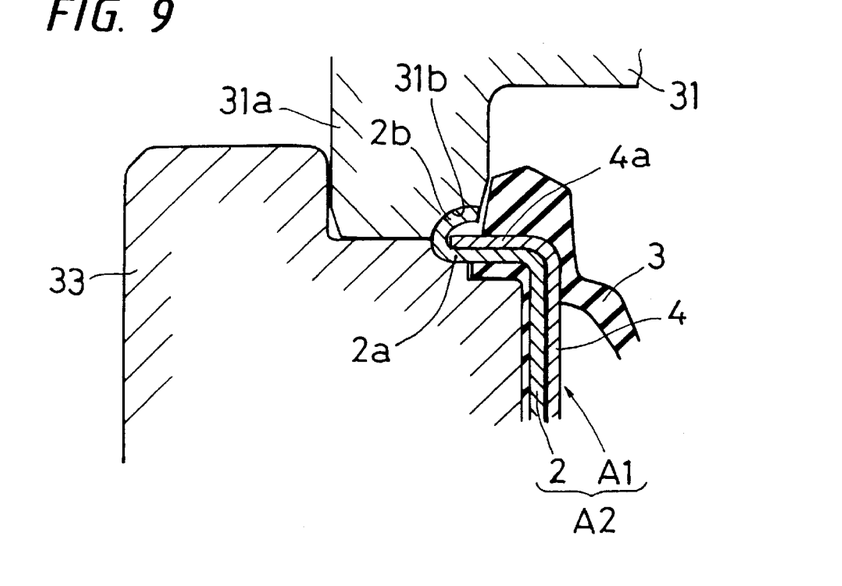
FIG. 9 is a magnified sectional view of an essential part in a state of caulking by a first caulking die.
Figure 10:
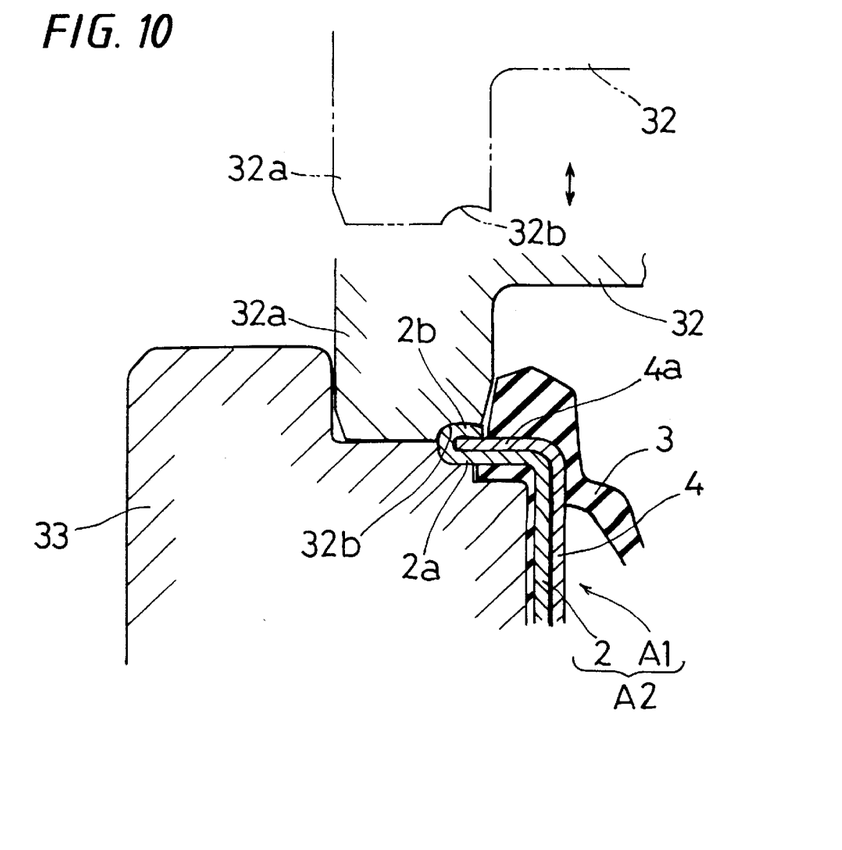
FIG. 10 is a magnified sectional view of an essential part in a state of caulking by a second caulking die.

That is, the projecting die portion 31a of the first caulking die 31 is formed with the curved surface 31b to urge the flange end 2b of the outer cylinder 2 and bend it by a predetermined angle less than 90 degrees (e.g. 45 degrees) into a curbed form, as shown in FIG. 9. Furthermore, the projecting die portion 32a of the second caulking die 32 is formed with a curved surface 32b to further bend, as shown in FIG. 10, the flange end 2b as bent by the first caulking die 31 and form it into a final predetermined caulking form, thus capable of making caulking in two stages.

Furthermore, on the axis at the inward of the first and second caulking dies 31, 32, a pin 38 is projected downward to fit with the inner cylinder 1 of the assembly A2 thereby enabling press-fit with the axis of the assembly A2 held.

The robot 40 has an arm 41 movable up and down, left and right and back and forth through a plurality of joints. The arm 41 at its tip has a clamp 43 provided through a rotation mechanism 42. This arm 41 is provided having a role as transporting means to grip the internal unit A1 as a work being assembled in a predetermined supply section (not shown) to transport it to an air-discharging inversion section 15 and transport the internal unit A1 after air discharge in the air-discharge inversion section 15 to the press-fit device 20 to supply it to a position above the outer cylinder 2 set in the press-fit lower die 21, and a role as transporting means to grip the assembly A2 completed in press-fit in the press-fit device 20 and transport it to the caulking lower die 33 of the press-fit device 30. Furthermore, transport means is also provided to transport the assembly A2 after completion of caulking to a liquid-cut inversion section 17 at an outside of the liquid tank 13. These operations are set in relation to the operation of press-fit and caulking.

Incidentally, the air-discharge inversion section 15 is provided to rotate the internal unit A1 transported by the arm 41 by a predetermined angle in opposite directions about a horizontal axis in FIG. 1 in the liquid within the liquid tank 13 and discharge the interior air due to vertical inversion of the unit. This inversion action may be made by holding by means other than a clamp 43 of the arm 41 or made in a held state by the clamp 43. Also, the liquid-removal inversion section 17 is provided to support the assembly A2 transported by the arm 41 outside the liquid tank 13 by supporting means 18 separate from the clamp 43 and discharge the external liquid due to rotation by a predetermined angle.

Hereunder, explanation will be made on a process of assembling an anti-vibration device 1 using the assembling apparatus 10 constructed as above.

Figure 6:
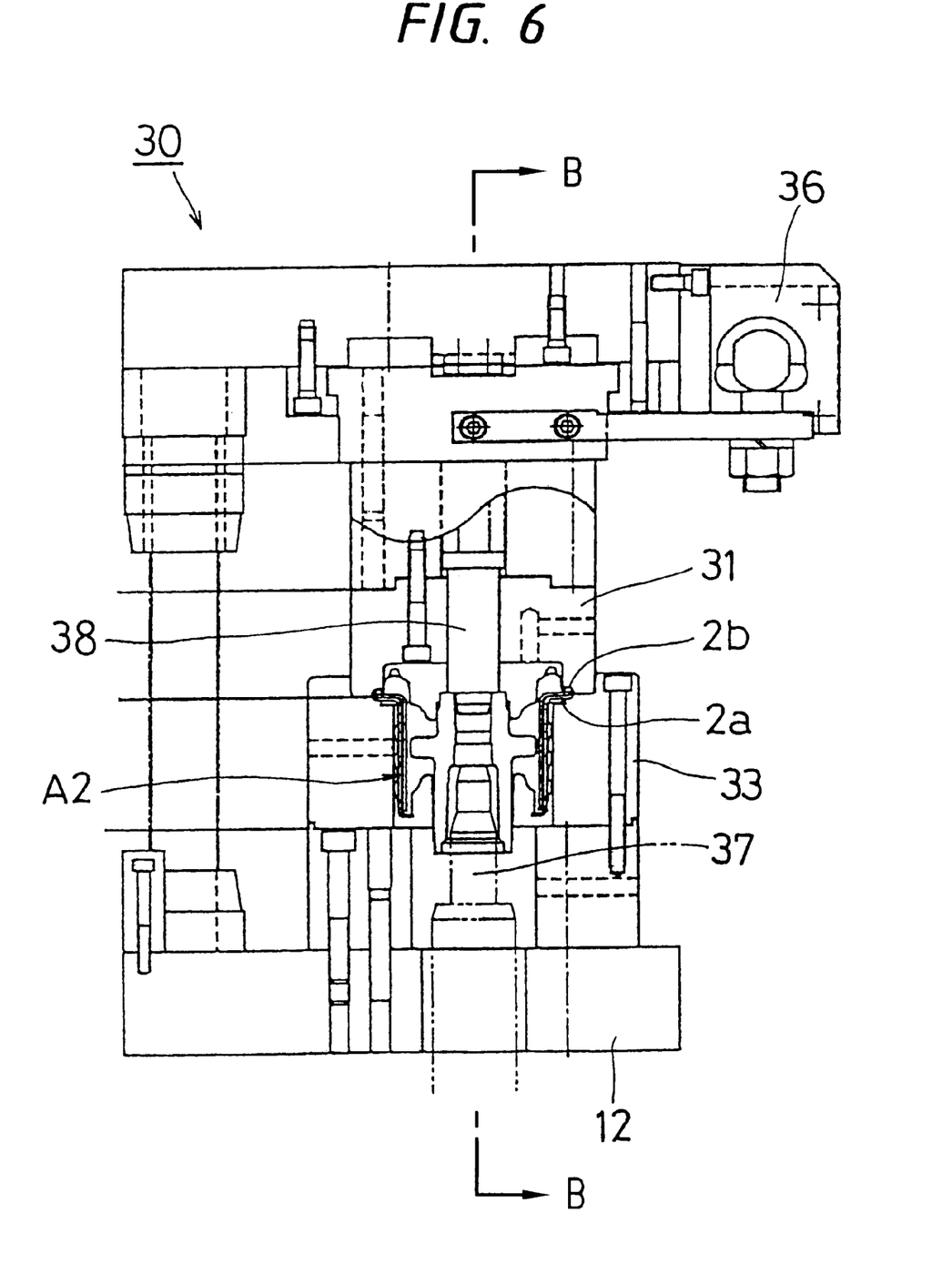
FIG. 6 is a magnified front view of the assembling apparatus omitting part of the caulking device.

The outer cylinder 2 is supplied and set in the press-fit lower die 21 within the liquid tank 13 of the press-fit device 20, on which an internal unit A1 is set as shown in FIG. 6 in a state of excluding the interior air. For example, in a state the support pin 25 at its tip is projected above from the liquid surface, the outer cylinder 2 is supplied and supported on the tip and supported as shown in FIG. 4 on the press-fit lower die 21 due to descending of the support pin 25. Also, the internal unit A1 is gripped by the clamp 43 at the tip of the arm 41 of the robot 40 and supplied from the air-discharge inversion section 15 to the above of the outer cylinder 2 where it is supported by fitting the inner cylinder 1 with the tip of the support pin 25. If this done, the clamp 43 is removed and the press-fit upper die 22 is lowered by operating the urging means 24. The pin 26 on the axis is fitted with in the inner cylinder 1 and the urging part 22a is caused to urge the flange 4a of the intermediate cylinder 4 of the internal unit A1, press-fitting the internal unit A1 into the outer cylinder 2.

When the press-fit is completed and the press-fit upper die 22 ascends, the clamp 43 of the robot 40 arm 41 gripping the assembly A2 completed in press-fit ascends and transports it to the caulking device 30 in the liquid. By ascending the support pin 37 of the caulking device, the tip fits with and supports the inner cylinder 1 of the assembly A2. In this state, it is descended to fit the outer cylinder 2 of the assembly A2 over the bore of the caulking lower die 33 and the flange 2a is supported on the upper peripheral edge of the lower die 33, thus achieving setting as shown by the chain line of FIG. 8.

At this time, the first caulking die 31 of the first and second caulking dies 31, 32 positions opposite above the lower die 33. In this state, the first caulking die 31 descends due to the operation of the urging means 35. By this descending, the pin 38 on the axis fits in the inner cylinder 1 and the projecting die 31a at its curved surface 31b urges the flange end 2b of the outer cylinder 2 to bend it inward by a required angle less than 90 degrees into a curved form, as shown in FIG. 9. At this time, the support pin 37 and the pin 38 are fit in the inner cylinder 1 of the assembly A2 and hold it at the axis, thus generally evenly bending the end 2b at its entire periphery without deviation.

Next, when the first caulking die 31 ascends, in place of the caulking die 31 the second caulking die 32 moves to the above of the caulking lower die 33 and positions opposite to the lower die 33. In this state, by descending the second caulking die 32 due to the operation of the urging means 35 similarly to the above, the pin 38 fits in the inner cylinder 1 and supports it at the axis. Furthermore, the curved surface 32b of the projecting die portion 32a furthermore bends the flange end 2b of the outer cylinder 2 already somewhat bent by the first press-fir die 31 and forms it into a predetermined caulking state as shown in FIG. 10. This caulks and fixes the end 2b of the flange 2a of the outer cylinder 2 over the flange 4a of the intermediate cylinder 4 in a state wrapping the end edge thereof.

Completing the caulking, a second caulking die 32 ascends. Thereafter, by ascending the support pin 37, the assembly A2 is pulled up from the caulking lower die 33, and gripped by the clamp 43 of the robot arm 41 and transported to the liquid-removal inversion section 17, being recovered after removal of liquid.

As described above, the flange end 2b at one end of the outer cylinder is caulked in divisional two stages by the first caulking die 31 and the second caulking dies 32. Due to this, as compared with the case of once caulking it to a bend angle of 90 degrees or greater, it is possible to suppress the occurrence of buckling in the bend point and prevent the occurrence of damage such as cracks. Thus, the assembly product can be improved in quality.

Incidentally, the assembling processes by the assembling apparatus 10, i.e. the supply of the internal unit A1 and outer cylinder 2 to the press-fit device 20, the press-fitting by the press-fit device 20, the caulking by the caulking device 30, transportation of the assembly A2 and the like, are set for automatic operations as a series of operations.

The present invention is not limited to the above embodiment but to be construed including a wide scope of modifications within a range of not departing from the spirit of the invention.

What is claimed is:

1. An apparatus for assembling an anti-vibration device having an inner cylinder, an intermediate cylinder, a rubber elastic member arranged between the inner and intermediate cylinders, and an outer cylinder fitted outward of the intermediate cylinder, and a liquid chamber formed in an interior of the rubber elastic member, the anti-vibration device assembling apparatus comprises;

a press-fit device for press-fitting together a press fitted assembly including an internal unit which is press fitted into an outer cylinder within a liquid tank, the internal unit comprising: an inner cylinder connected through a rubber elastic member to an intermediate cylinder having a generally radially extending flange;

a caulking device for caulking an end of said outer cylinder to the flange of the intermediate cylinder of a press fitted assembly; and transport means for transporting said press fitted assembly from said press-fit device to said caulking device;

wherein said caulking device is provided to allow two stages of caulking by first and second kinds of calking dies including a first caulking die to bend an end of said outer cylinder of said press fitted assembly by a predetermined angle less than 90 degrees and a second caulking die to further bend said end of said outer cylinder already bent to a certain degree into contact with the flange of the intermediate cylinder.

2. An apparatus for assembling an anti-vibration device according to claim 1, wherein said caulking device comprises a caulking lower die for supporting said press fitted assembly with said axial one end to be caulked positioned up, and said first and second caulking dies being vertically movably supported above said lower die, said first caulking die for applying a first stage of caulking to said axial one end of said outer cylinder of said press fitted assembly supported in said lower die, and said second caulking die for applying a second stage of caulking to said one end in order for further bending into a predetermined form.

3. An apparatus for assembling an anti-vibration device according to claim 2, wherein said first caulking die and second caulking die above said lower die are movably provided in a transverse direction to an axis thereof and alternately oppositely positioned to said lower die.

4. An apparatus for assembling an anti-vibration device according to claim 2 or 3, wherein said caulking lower die has, in an axis portion, a support pin vertically movable to fit with and support said inner cylinder of said press fitted assembly, and first and second caulking dies have, in respective lower axis portions, pins to fit in an upper potion of said inner cylinder of said press fitted assembly due to descend action.

5. An apparatus for assembling an anti-vibration device according to claim 1 or 2, wherein said transport means comprises an arm of a robot having, at a tip, clamp means to grip said internal unit and said press fitted assembly to carry out supply of said internal unit to said press-fit device, transport of said press fitted assembly completed of press-fitting from said press-fit device to said caulking device and taking said press fitted assembly completed of caulking out of said caulking device.

\* \* \* \* \*